US008213915B1

(12) United States Patent
Upadhyay et al.

(10) Patent No.: US 8,213,915 B1
(45) Date of Patent: Jul. 3, 2012

(54) HTTP SESSION MANAGEMENT

(75) Inventors: Piyush Upadhyay, Overland Park, KS (US); Badri P. Subramanyan, Overland Park, KS (US); Shilpa Kowdley Srinivas, Herndon, VA (US); Hemanth Balaji Pawar, Herndon, VA (US)

(73) Assignee: Sprint Communications Company, L.P., Overland Park, KS (US)

( * ) Notice: Subject to any disclaimer, the term of this patent is extended or adjusted under 35 U.S.C. 154(b) by 660 days.

(21) Appl. No.: 12/370,293

(22) Filed: Feb. 12, 2009

(51) Int. Cl.
*H01L 29/06* (2006.01)
(52) U.S. Cl. .............. 455/414.3; 455/414.1; 455/436; 455/432.1; 709/231
(58) Field of Classification Search .............. 709/231, 709/227; 455/414.1, 436, 432.1, 227
See application file for complete search history.

(56) References Cited

U.S. PATENT DOCUMENTS

| | | | |
|---|---|---|---|
| 2003/0217163 A1* | 11/2003 | Lagerweij et al. | 709/229 |
| 2003/0236905 A1* | 12/2003 | Choi et al. | 709/231 |
| 2007/0091848 A1* | 4/2007 | Karia et al. | 370/331 |
| 2009/0043908 A1* | 2/2009 | Masunaga et al. | 709/231 |

\* cited by examiner

*Primary Examiner* — Nick Corsaro
*Assistant Examiner* — Quan Hua

(57) ABSTRACT

A method, system, and computer readable media are provided for maintaining a mobile session. A session identifier and an associated idle time period are created by the gateway as part of a session header between a wireless device and a content source. When an interruption occurs before a session request for information or data has been completed, the partially transferred information or data is buffered on the gateway, along with its associated session identifier. When the wireless device reconnects, using the associated session identifier header, then the buffered information or data is transferred from the gateway, to the wireless device. The resumed transfer of information or data occurs at the point where the partial transfer stopped, when the interruption occurred. The information or data is completely transferred from the content source to the wireless device, via the gateway.

17 Claims, 3 Drawing Sheets

HTTP SESSION MANAGEMENT

Conventionally, HTTP session information between a client and a server is implemented using HTTP cookies. However, this cannot be applied for a mobile HTTP session between a wireless device and a gateway. In a mobile HTTP session environment, a HTTP request and the resultant response do not have session information.

The mobile HTTP session between the wireless device and a gateway is implemented using Internet Protocol (IP) address and port information. The gateway identifies HTTP cookies and other transitional data for the wireless device, based upon the IP to port mapping, to deliver communications destined for the wireless device.

The wireless device can change physical location, which may require the wireless device to obtain a different IP address. In other instances, the wireless device may lose a communication connection with the gateway, due to physical barriers in mid-session. When a wireless device changes its IP address or loses a connection in the middle of a session, the prior uploaded or downloaded information or data is lost. After reconnecting, the session uploading or downloading will have to start all over again.

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a method is described for maintaining a mobile HTTP session during an interruption of the mobile HTTP session. The interruption could be caused by changing the wireless device's IP address to a different IP address, or the interference of physical barriers to any communication associated with the wireless device. A wireless device request for information or data from a content source is made from a particular IP address. When the content source responds to that request, the gateway creates a session identifier in the header of the response. Therefore, if an interruption occurs between the wireless device and the content source before the complete response is transmitted, the partial information or data is stored on the gateway with the session identifier. When the wireless device attempts to reconnect with the content source again, the same session identifier is used with the reconnection request. The partial information or data that was stored on the gateway is returned to the mobile device, and the content source continues to transfer the remaining requested information or data, from the same point where the interruption occurred.

In another embodiment of the invention, a mobile session system is described. A gateway operates to maintain sessions between a wireless device and a remote server. The gateway forwards requests from the wireless device to the remote server, and forwards responses from the remote server to the wireless device. A request for information or data from a wireless device to a content source on a remote server is made using an Internet Protocol (IP) address assigned to the wireless device. The content source responds by transferring that information or data to the wireless device, via the gateway. The session between the wireless device and the content source contains a session identifier, created by the gateway and located in the session header.

When an interruption occurs due to wireless device movement that requires assignment of a different IP address to the wireless device, or physical barriers block a connection between the wireless device and gateway, the gateway archives session information. The information or data that was partially transferred to the wireless device is stored on the gateway, along with the same session identifier of the original session. In addition to the session identifier, a session header also contains an idle time period associated with that session identifier. The idle time is the amount of time that the associated session identifier is available for reconnection of the session. The idle time period can be extended, if the session has not completed by the end of the original idle time period. In turn, a reconnection is eventually made from the wireless device to the same content source, usually from a different IP address, using the same session header identifier as before. This results in a subsequent transfer of the remaining information or data to the wireless device. Accordingly, it is not necessary to start a transmission over from the beginning when an interruption occurs, because the same session identifier is used in each HTTP session header, to and from the gateway.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
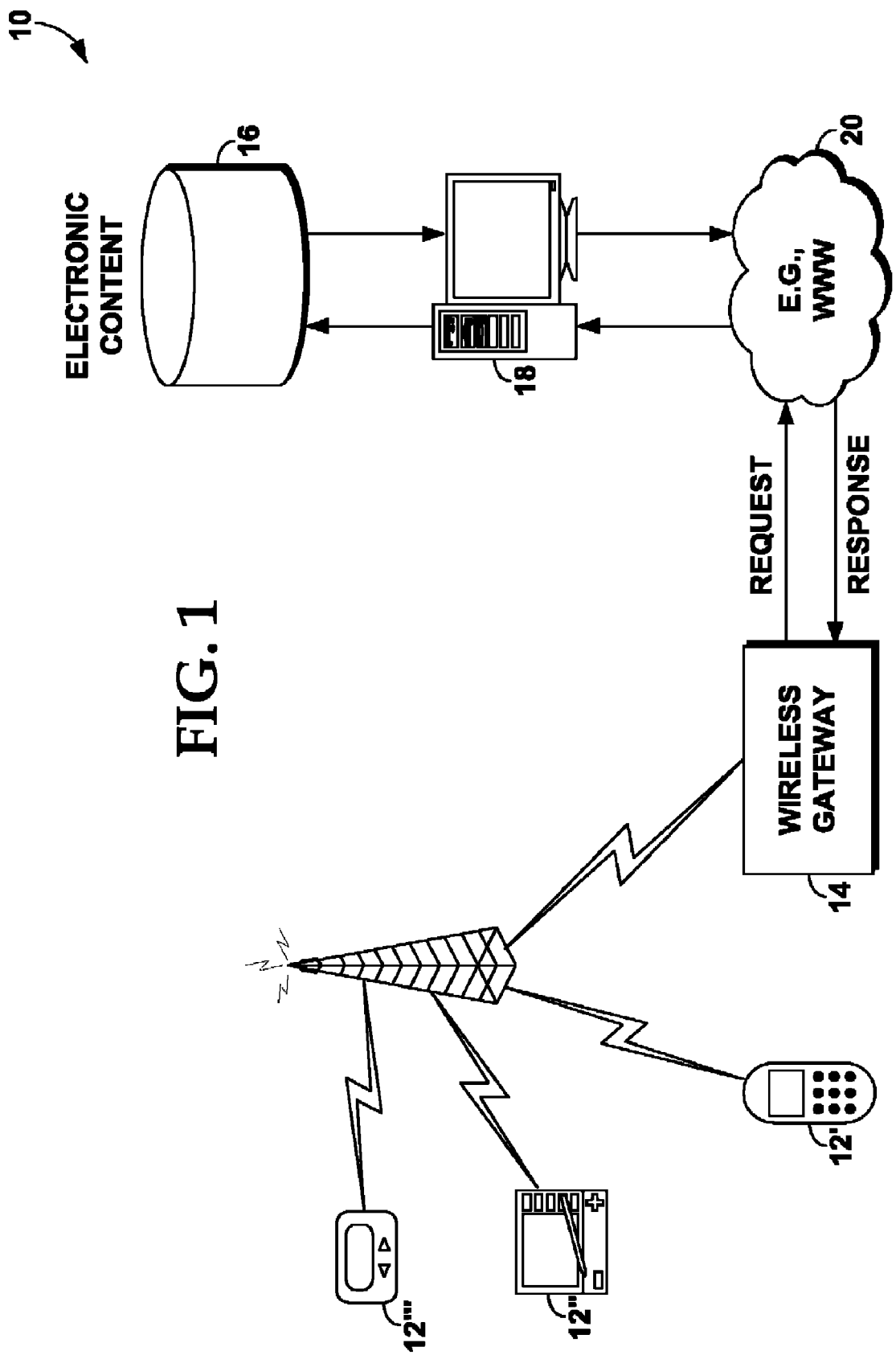
FIG. 1 is a block diagram illustrating an exemplary wireless network system.

Embodiments of the invention provide systems and methods for maintaining a mobile session. This detailed description satisfies the applicable statutory requirements. The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of any embodiments of the invention.

Embodiments of the invention include, among other things, a method, system, or set of instructions embodied on one or more computer-readable media. Computer-readable media include both volatile and nonvolatile media, removable and nonremovable media, and media readable by a database and various other network devices. Computer-readable media comprise computer storage media and communication media. By way of example, and not limitation, computer-readable media comprise media implemented in any method or technology for storing information. Examples of stored information include computer-useable instructions, data structures, program modules, and other data representations. Computer storage media include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Communication media can embody computer-readable instructions, data structures, program modules or other data in an electronic data signal, and includes any information delivery media. By way of example, and not limitation, communication media includes wired media such as a wired network or direct-wired connection, and electronic data signals, such as acoustic, radio frequency (RF), infrared and other wireless media. Combinations of any of the above should also be included within the scope of computer-readable media.

An overview of a telecommunications system will be described, with reference to FIG. 1. FIG. 1 is a block diagram illustrating an exemplary wireless network system 10. Wireless network system 10 includes wireless devices 12, wireless gateways 14, databases 16 including electronic content, database servers 18, and information network 20. However, none of the embodiments of the invention are limited to these components and more, fewer or other components can also be used in wireless network system 10. For simplicity, only one wireless gateway 14, database 16, and database server 18 are illustrated in FIG. 1.

The wireless devices 12 include wireless phones 12', personal digital assistants ("PDA") 12", one and two-way pagers 12''' and other types of wireless mobile and non-mobile devices (not illustrated). Wireless devices 12 may include devices that typically connect using a wireless communications medium such as radio frequency (RF) devices, infrared (IR) devices, or integrated devices combining one or more of the preceding devices. A wireless device, as described herein, refers to any type of wireless phone, handheld device, personal digital assistant (PDA), BlackBerry®, smartphone, digital camera, or other mobile devices (aside from a laptop) capable of communicating wirelessly. One skilled in the art will appreciate that wireless devices will also include a processor and computer-storage media to perform various functions. In embodiments, computing devices can also refer to devices that are running applications of which images are captured by the camera in a mobile device.

The wireless devices 12 encompass a general computing system used in accordance with the embodiments of the invention. A wireless device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ any form of carrier medium for communicating information from one computing device to another, such as through a universal serial bus (USB) port, Ethernet link, wireless forms of carrier media, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G) and $3^{rd}$ (3G) generation radio access for cellular systems, Wireless-LAN, or Wireless Router (WR) mesh. Access technologies such as 2G, 3G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, "GSMC"), Worldwide Interoperability for Microwave Access (WiMAX), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the wireless devices 12. The WAP includes several protocols and standards designed to provide wireless devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for wireless devices such as wireless phones than other markup languages such as Hyper Text Markup Language ("HTML"), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The databases 16 include electronic content such as text, hypertext, graphical data or references to graphical data images, audio, video, and other content. The electronic content may be stored as a web page or WAP page on a database server, such as server 18. The server 18 can download electronic content from the database 16 to the wireless device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice extensible Markup Language (VoxML"), and others. Markup languages also allow references to additional electronic content other than text, including graphics, animation, audio, video, applets, and other electronic data.

Electronic content is displayed on a wireless device 12 with a software application, such as but not limited to a "browser." A browser on a wireless device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the wireless device 12.

The wireless devices 12 illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other proprietary standards.

An operating environment for wireless devices and interfaces used for embodiments of the invention include a processing system with one or more high speed central processing unit(s) ("CPU"), or other types of processors, and a memory system. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Hypertext Transfer Protocol (HTTP) is a communications protocol used for retrieving inter-linked text documents (hypertext). HTTP is a request and response standard between a client, which is also known as a user agent, and a server. A mobile-to-HTTP protocol gateway (MHG) translates between standard wireless protocol commands and an application server, such as a web server on the Internet.

Figure 2:
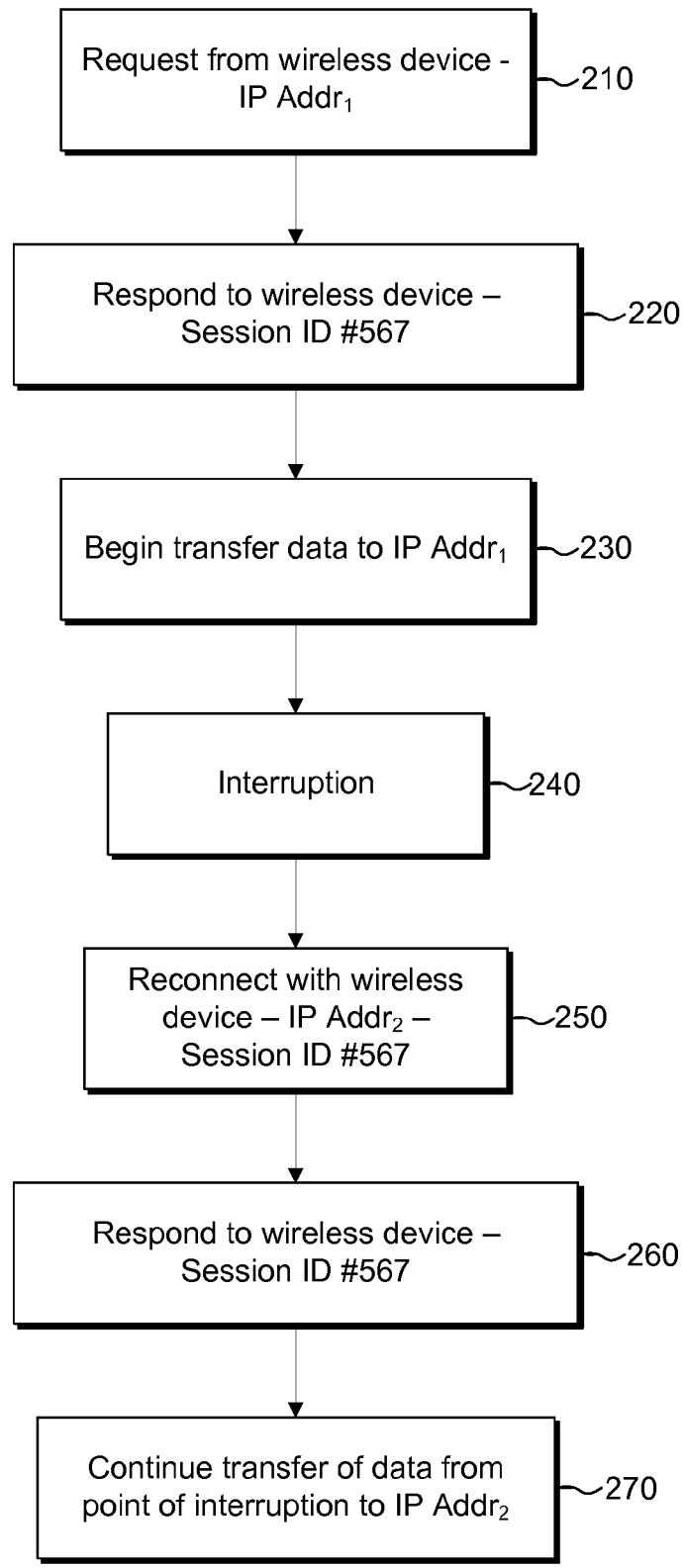
FIG. 2 is a flowchart of a computer-implemented process in accordance with the embodiments of the invention.

FIG. 2 is a flowchart of a computer-implemented process, in which a mobile device continues a session with a content source, even across multiple Internet Protocol (IP) addresses. A wireless device connects to a remote server through a gateway. The connection can be for the purpose of reaching a website through the Internet to obtain information or data. This is just one example of several possibilities of a wireless connection. The request from the wireless device may be initiated from a particular IP address$_1$, at step 210.

When a response is sent to the wireless device, a session identifier is created by the gateway, and is sent back to the wireless device as part of the session header in the response. The device and gateway use this session identifier, as long as a session is valid. As an example, for illustrative purposes only, this first session is labeled as Session #567 at step 220. The session identifier will identify the specific connection made between the mobile device and an Internet content source connection.

The requested information or data begins to transfer to the wireless device, at step 230. In many instances, a wireless device may change its location during a session, which would result in the wireless device changing its original IP address$_1$. This may cause the Session #567 to be interrupted, at step 240. A session interruption may be due to physical barriers that block transmission of the session communication. When an interruption occurs, the wireless device will attempt to reconnect to the Internet connection, in order to continue receiving the requested information or data. However, the wireless device may be attempting to reconnect from a different IP Address$_2$, at step 250. When this reconnection is attempted by the wireless device, the same Session ID #567 is transmitted to the content source, at step 260. Therefore, the content source recognizes the Session ID #567, and continues sending the requested information or data from the point at which the interruption occurred at step 240, rather than starting all over again with the transmission response, at 270.

Even though there were two separate sessions, the session identifier allows the initial request to be completed, as though there was no interruption. This is accomplished, in part by setting an idle time period in the session header. The idle time period, which is also called a time to live, is achieved by sending a random number, along with a time to live, from the gateway to the wireless device. The wireless device is asked to include the session ID number in consecutive HTTP requests for this browsing session. The idle time period is the amount of time in which the session identifier will remain available, in order to reconnect and transfer the remaining information or data. Therefore, the wireless device has an amount of time, equal to the idle time period, in which to reconnect to the content source via the gateway, and continue to transfer the information or data originally requested. The idle time can be extended by the gateway, in the event that complete transfer does not occur in the allotted time period.

The partial information or data that was originally transferred to the wireless device is stored on the gateway during the idle time, when an interruption occurs. When a reconnection is made, the stored information or data on the gateway is sent back to the wireless device, and the remaining information or data continues to be transferred to the mobile device from the content source. This is made possible, in part by using the same session identifier in the header at each step of the session process, which allows the mobile device, the gateway, and the content source to be linked to the same session each time that session identifier is used.

Figure 3:
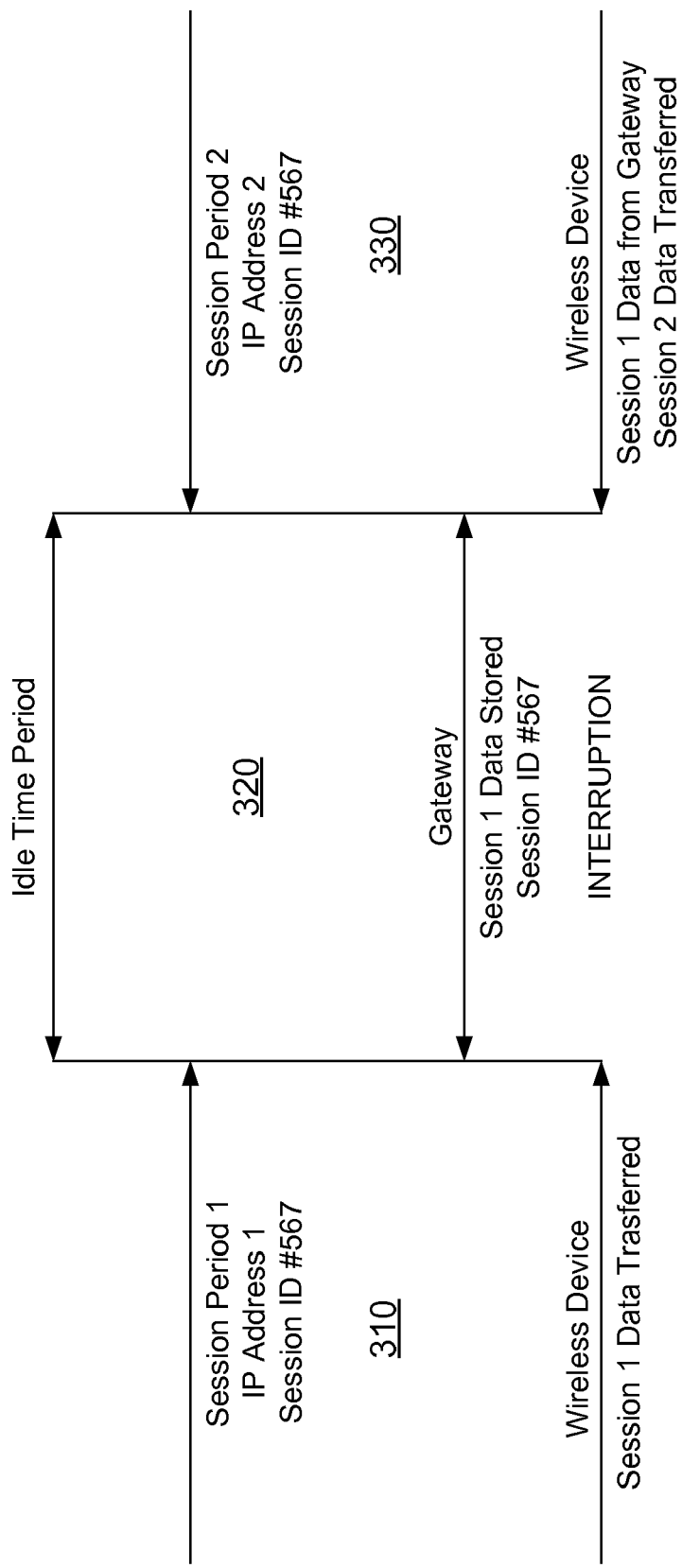
FIG. 3 is a timeline chart for a mobile communication session for implementing the embodiments of the invention.

FIG. 3 is a timeline chart of a mobile session system for implementing the embodiments of the invention. FIG. 3 can be viewed as a timeline, from left to right. A wireless device is used to create a session with a content source. This session is labeled as Session Period 1, for illustrative purposes, at timeline 310. The Session Period 1, between the wireless device and the content source, has an IP address$_1$ and a session identifier, such as Session ID #567. The session ID number is formed in the header of the session request by the gateway. Requested data or information begins to be transferred from the content source to the wireless device, at timeline 310.

At timeline 320, an interruption occurs, during which the transferred information or data, received prior to the interruption during timeline 310, is buffered on the gateway, along with the header Session ID #567. The interruption could have occurred as a result of movement of the wireless device out of the region of the IP Address, or due to a physical barrier. The buffered information or data is stored on the gateway in association with the Session ID #567, during an idle time period, which is specified by timeline 320.

At timeline 330, reconnection between the wireless device and the content source occurs. Even if the reconnection occurs from a new IP address, the same Session ID #567 is included in the header of the reconnection request from the wireless device. As a result, the information or data that was stored on the gateway is transferred to the wireless device. During a new mobile HTTP session, illustrated as Session Period 2, the transfer of the original request for information or data is completed. The remaining transfer of information or data does not require starting over at the beginning of the transfer. This is made possible, in part by using the same session identifier in the header at each timeline, which allows the wireless device, the gateway, and the content source to be linked to the same session each time that session identifier is used.

Many different arrangements of the various components depicted, as well as components not shown, are possible without departing from the spirit and scope of the several embodiments of the invention. Embodiments of the invention have been described with the intent to be illustrative rather than restrictive. Alternative embodiments configured with after-knowledge equivalents are within the scope of the embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer implemented method of maintaining a mobile session, comprising:
   receiving a first request to a content source server, from a wireless device originating from a first Internet Protocol (IP) address;
   responding to said wireless device by forming a first session and creating a session identifier for the first session;
   beginning to transfer data via at least a radio communication link from a content source database to said wireless device in response to said first request;
   detecting a degradation in signal quality of the radio connection during said first session that causes an interruption in said radio communication link;
   after said interruption, storing said data and said session identifier on a gateway, and
   receiving a second request to said content source server, from said wireless device currently originating from a second IP address,
   wherein said second session request includes said session identifier and said second IP address;
   responsive to receiving said second session request, forming a second session with said session identifier to continue transferring said data; and
   continuing to transfer said data from said content source database to said wireless device in response to said second request,
   wherein data transfer of said second session begins at a point where data transfer of said first session discontinued when said interruption occurred.

2. The method of claim 1, wherein said first session identifier comprises a header session identifier.

3. The method of claim 2, wherein said header session identifier comprises an idle time period, wherein said header session identifier will remain available for said continuing to transfer data after said interruption.

4. The method of claim 3, wherein storing said data on said gateway comprises storing said data during said idle time period.

5. The method of claim 3, wherein said idle time period can be extended.

6. The method of claim 1, wherein said first IP address differs from said second IP address.

7. The method of claim 1, wherein said first session and said second session comprise a session between said wireless device and a gateway.

8. A mobile session system, comprising:
   a gateway forming a first session in response to a first request from a wireless device from a first IP address to a content source server,
   said first session comprising a header session identifier,
   wherein said gateway is operative to maintain sessions with said wireless device, and further operative to forward requests from and responses to said wireless device;
   a content source database transferring an initial data set to said wireless device via at least a radio communication link in response to said first request of said first session;
   said gateway detecting a degradation in signal quality of the radio connection during said first session that causes an interruption in said radio communication link, after said interruption,
   storing said initial data set and said session identifier on said gateway
   and
   forming a second session with said session identifier in response to a second request from said wireless device currently originating from a second IP address to said content source server,
   said second session comprising said header session identifier and said second IP address; and
   said content source database transferring a remainder data set to said wireless device, in response to said second request of said second session;
   wherein said transferring said remainder data set of said second session begins at a point where said transferring an initial data set of said first session discontinued when a session interruption caused by a break in communications to said content source server occurred.

9. The system of claim 8, wherein said header session identifier comprises an idle time period, wherein said header session identifier will remain available for said transferring a remainder data set after said interruption.

10. The system of claim 9, wherein said initial data set is stored on said gateway during said idle time period when said interruption occurs.

11. The system of claim 8, wherein said first IP address differs from said second IP address.

12. In a computer system, one or more non-transitory computer readable media for storing instructions that cause a processor to perform the steps of a method of maintaining a mobile session, comprising:
   providing a mobile session system, comprising:
      a wireless device;
      a gateway;
      a content source server;
      a content source database; and
      said computer readable media;
   receiving a first request to said content source server, from said wireless device originating from a first Internet Protocol (IP) address;
   responding to said wireless device by forming a first session and creating a session identifier for the first session;

beginning to transfer data via at least a radio communication link from said content source database to said wireless device in response to said first request;

detecting a degradation in signal quality of the radio connection during said first session that causes an interruption in said radio communication link;

after said interruption, storing said data and said session identifier on said gateway, and receiving a second request to said content source server, from said wireless device currently originating from a second IP address, wherein said second session request includes said session identifier and said second IP address;

responsive to receiving said second session request, forming a second session with said session identifier to continue transferring said data; and continuing to transfer said data from said content source database to said wireless device in response to said second request, wherein data transfer of said second session begins at a point where data transfer of said first session discontinued when said interruption occurred.

13. The computer readable media of claim 12, wherein said session identifier comprises a header session identifier.

14. The computer readable media of claim 12, wherein said first IP address differs from said second IP address.

15. The computer readable media of claim 12, wherein said header session identifier comprises an idle time period, wherein said header session identifier will remain available for said continuing to transfer data after said interruption.

16. The computer readable media of claim 15, wherein storing said data on said gateway during said idle time period.

17. The computer readable medium of claim 15, wherein said idle time period can be extended.

* * * * *